W. C. GRAHAM.
FILTERING APPARATUS AND SYSTEM.
APPLICATION FILED JULY 26, 1915. RENEWED SEPT. 25, 1917.
1,264,635.
Patented Apr. 30, 1918.
4 SHEETS—SHEET 1.
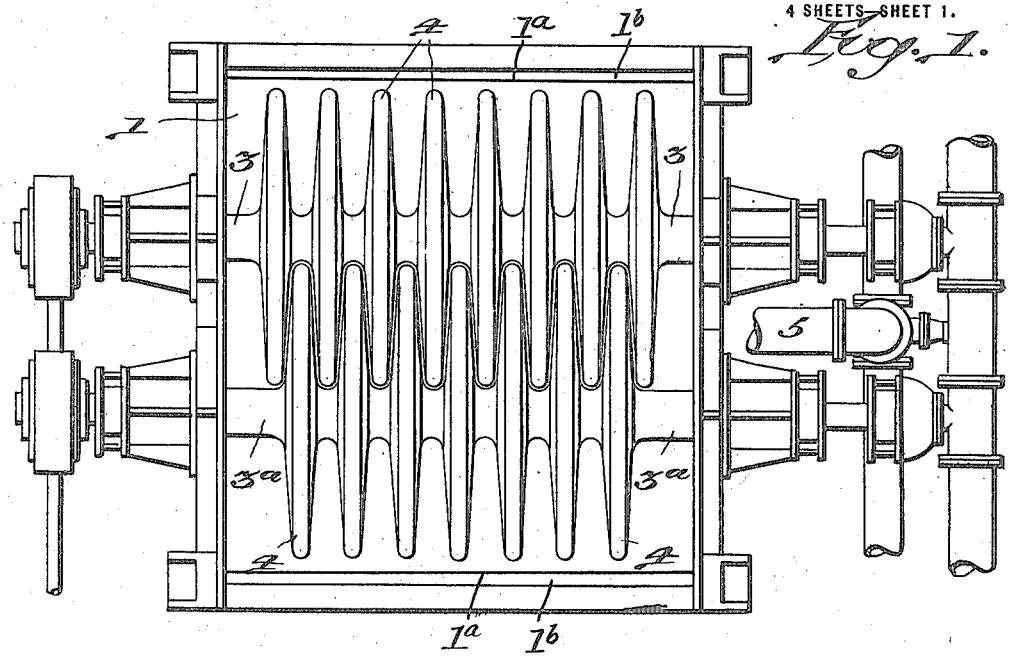
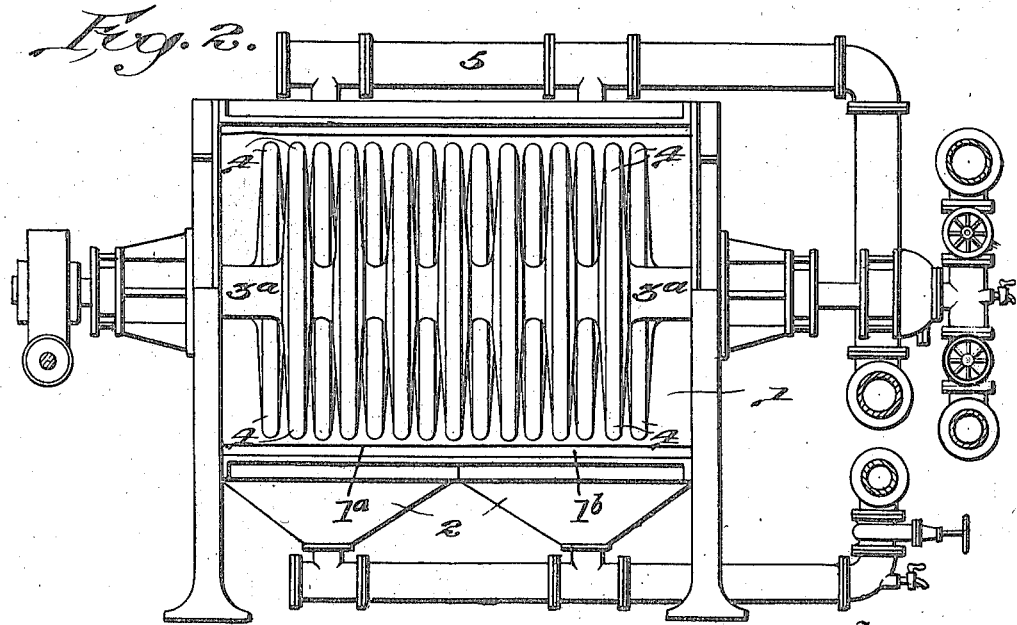

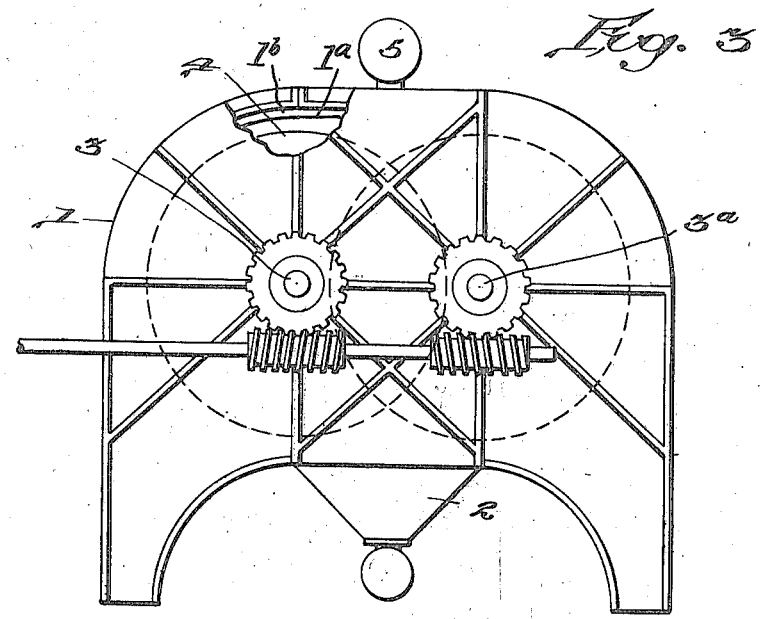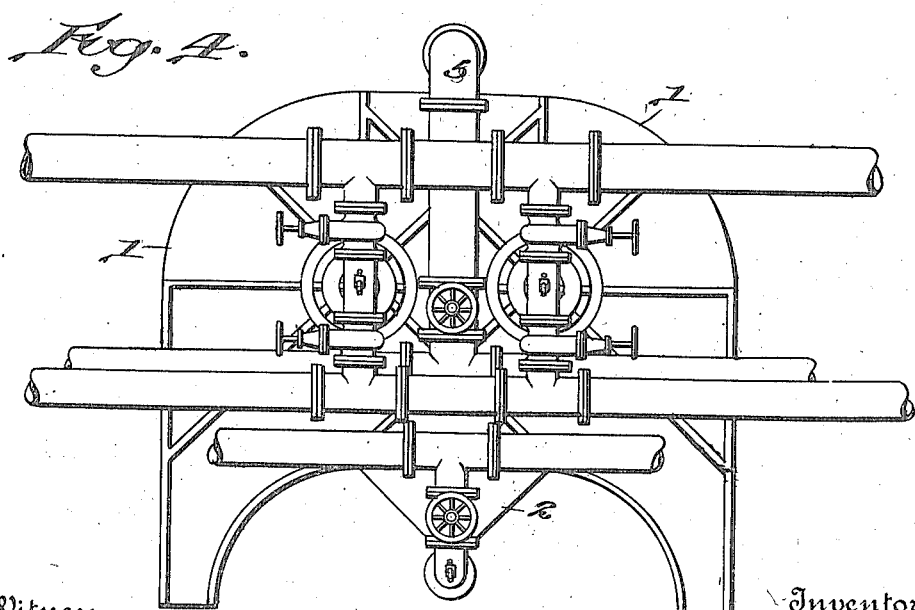

W. C. GRAHAM.
FILTERING APPARATUS AND SYSTEM.
APPLICATION FILED JULY 26, 1915. RENEWED SEPT. 25, 1917.
Patented Apr. 30, 1918.
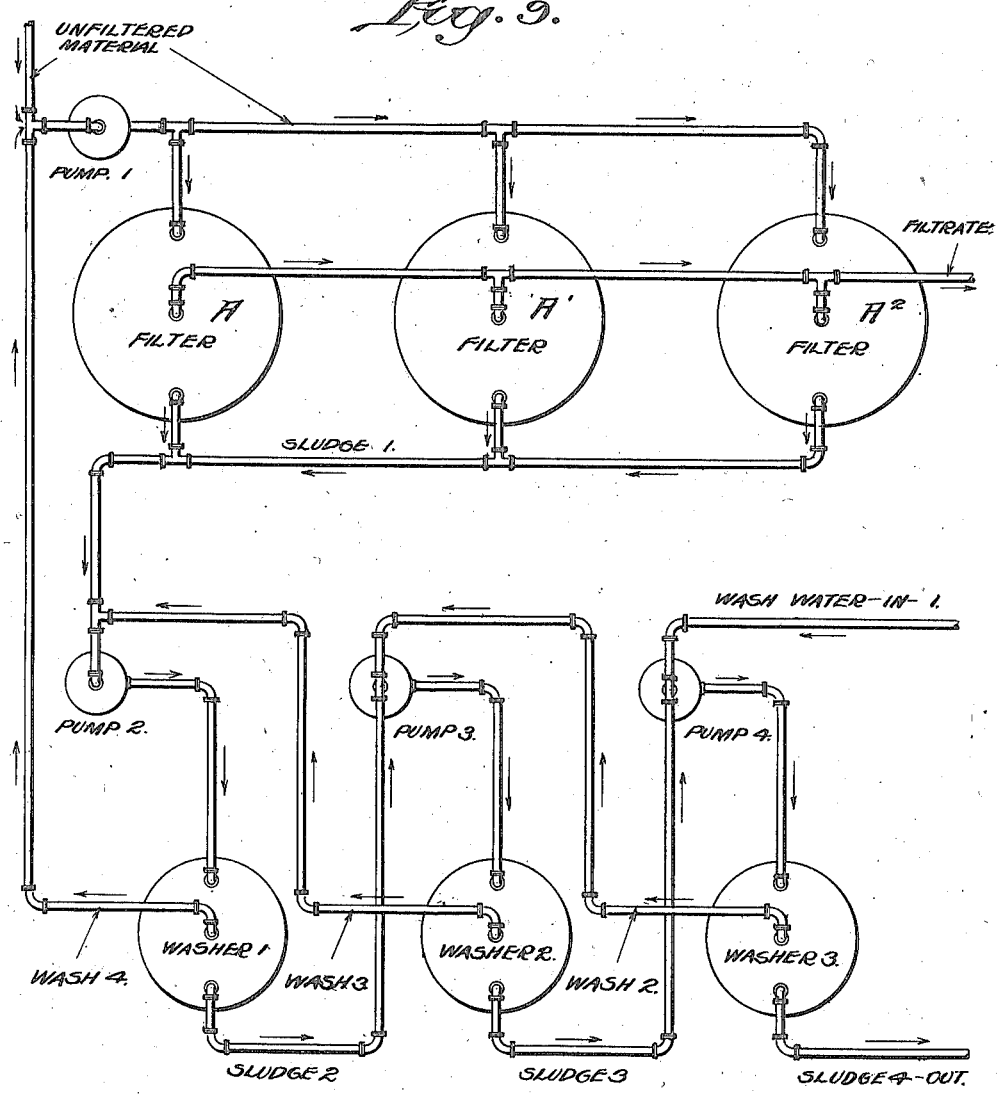
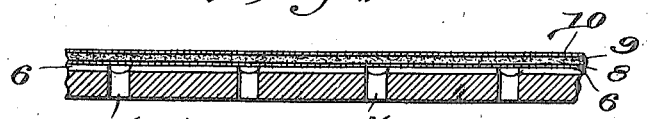

UNITED STATES PATENT OFFICE.

WALTON C. GRAHAM, OF LOVELAND, COLORADO.

FILTERING APPARATUS AND SYSTEM.

1,264,635.  Specification of Letters Patent.  Patented Apr. 30, 1918.

Application filed July 26, 1915, Serial No. 41,942. Renewed September 25, 1917. Serial No. 193,216.

*To all whom it may concern:*

Be it known that I, WALTON C. GRAHAM, a citizen of the United States, residing at Loveland, in the county of Larimer and State of Colorado, have invented new and useful Improvements in Filtering Apparatus and Systems, of which the following is a specification.

The object of this invention is to provide means for the filtration or separation of liquids from solids whereby a more efficient and economical separation or filtration may be accomplished. The invention includes means for the uninterrupted continuous separation of filtrate and solids and the disposition of the same after separation and the cleaning to any desired degree of the residuary of the solid matter from the matter adhering to it after separation.

The invention is applicable to a wide range of operations in the field of manufacturing and chemical industry. The specific use herein illustrated will be confined to its use in the sugar industry and particularly in the filtration of hot carbonated beet juices, washing of precipitates, recovery of the sugar from the same, the filtration of precipitated calcium saccharate from solutions of molasses and washing of the same as well as the filtration of heavier liquors and syrups, with or without the use of bone-black, kieselguhr, etc.

The invention consists further of the novel construction and arrangement of parts together with the specific method of operation and will be more fully described and set forth in the following specification and claims and illustrated in the accompanying drawings, in which—

Figure 1 is a top plan view of a filter machine, with the top removed, illustrating the operative relation between the interspaced rotary filter members.

Fig. 2 is a side view of the machine illustrated in Fig. 1.

Fig. 3 is a view of the power end of the machine illustrated in Fig. 1, showing the worm gear drive means for turning the shafts in opposite direction.

Fig. 4 is a view of the opposite end of the machine illustrated in Figs. 1, 2 and 3, showing a pipe connection to it.

Fig. 9 is a view of an arrangement of a plurality of the filter machines operating as a continuous system.

Fig. 10 is an enlarged view of a section through a filter member illustrating the particular construction of the member and its filter surface, showing the grooves channeled into the outer face of the metal disk and running under the filter material.

Figure 5:
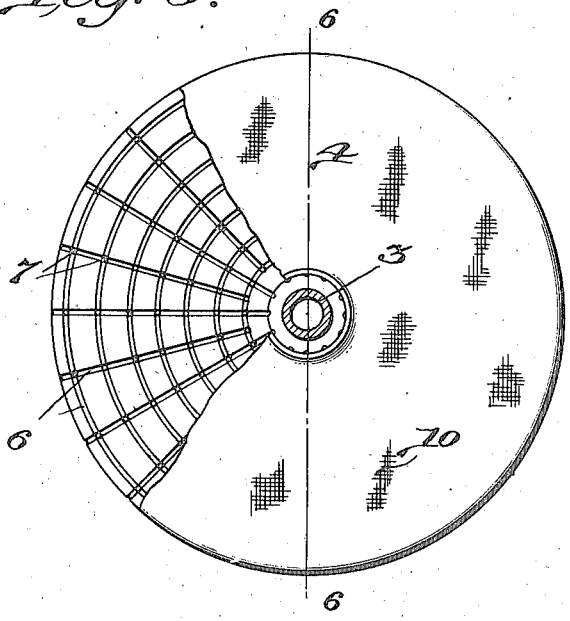
Fig. 5 is a view of the side of one of the individual filter members showing the grooves channeled in the outer face of the metal disk.
Figure 6:
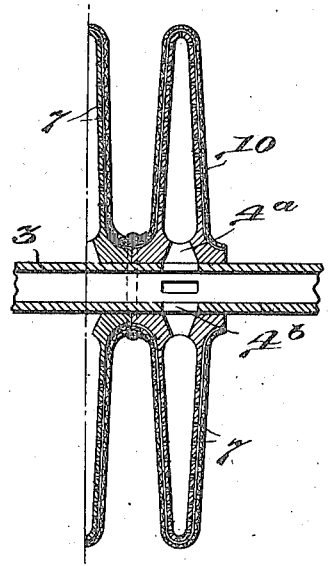
Fig. 6 is a view of the individual filter member taken on the line 6—6 of Fig. 5 and illustrating the construction of the disk and filter body together with the overlapping edges of the outer woven covering.
Figure 7:
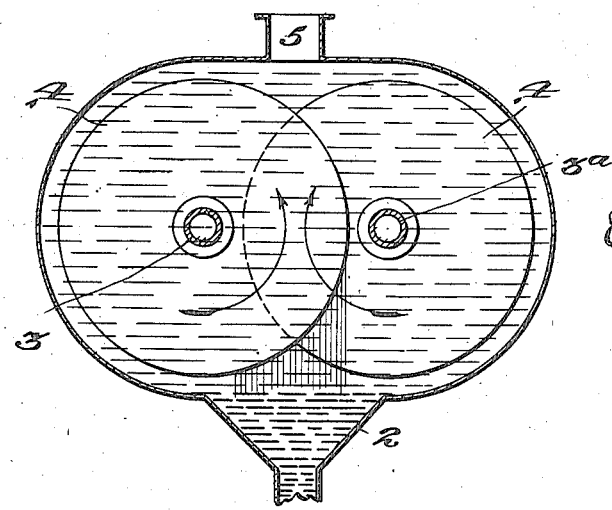
Fig. 7 illustrates diagrammatically the direction of rotation of the filter members, the vertical lines illustrating the direction taken by the solid matter when displaced from the filter members.
Figure 8:
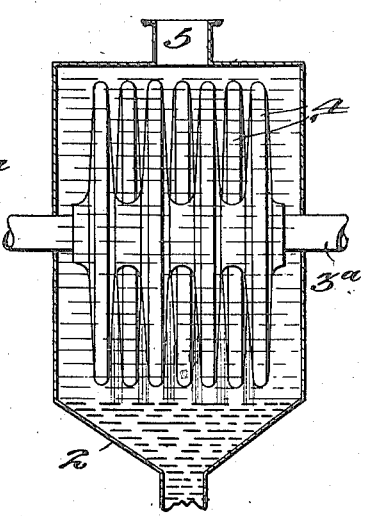
Fig. 8 is a side view of the machine illustrated in Fig. 7.

Referring to the drawings the apparatus consists of a metallic casing 1 of suitable shape and size provided with a hopper 2 at the bottom. Within this casing and mounted upon bearings, are two or more parallel tubular shafts, 3 and $3^a$, each supporting a number of filtering disks 4 which are covered by the filtering material, the interior of each disk communicating with the interior of the tubular shaft through the alined openings $4^a$ in the disk center and $4^b$ in the shaft, see Fig. 6. These shafts with the specially designed disks are so placed with reference to each other that the disks on one shaft are spaced to receive between them similar disks on the adjacent shaft and an equal distance is maintained between the filtering surface of the one disk and that of the other at all points, see Figs. 1, 2 and 8. The shafts bearing the disks are rotated by suitable gearing from without the casing, the bearings provided with packing glands, and the whole apparatus designed to resist pressure from within and prevent the escape of any material except at the respective outlets provided. At the top there is provided an inlet 5 for unfiltered material controlled by a suitable valve, the outlet of the filtrate being by way of the tubular shafts, and the outlet for the solids in the form of sludge being at the bottom of the hopper 2, also controlled by a valve.

The filtering surface of the apparatus consists of the entire area of all the disks on both shafts. These disks, preferably circular in outline, may be of any number or size to suit the condition of service required and are designed with a view to utilizing the entire area of the filtering material applied, and so that an equal distance may be maintained between the filtering surface of the disks on one shaft and those on the adjacent shaft. The hollow disks after being formed with the proper axial opening are mounted upon the tubular shafts by being forced into position or by any other suitable method so that the ports or openings $4^a$ of each disk exactly match and register with the corresponding openings $4^b$ in the shaft, the disks being perfectly rigid and immovable from their respective position. The entire surface of each disk is grooved or channeled to any required extent, to provide the canals or channels 6 beneath the filtering medium for escape of the filtered liquid, and at intervals, the channels so formed communicate with the hollow interior of the disk by means of holes or ports 7 of the proper size and number to insure the unimpeded flow of the filtrate to the interior of the disk, and thence through the tubular shaft out of the apparatus.

The entire surface of each disk is first covered by one thickness of a metallic screen 8 of suitable construction, the function of which is to support the filtering medium 9, and prevent the same from being forced into the channels or grooves 6 and thus obstructing the free flow of the filtrate. This screen supports the filtering medium in such a way that the entire area thereof is available for filtration. The filtering medium 9 may consist of a woven fabric or of fibrous material supported upon a woven fabric or may be of any material fulfilling the conditions connected with the operation of the machine. In the case where a woven fabric is used, it may consist of any suitable material of any construction and number of layers and is to be applied by being fashioned to the shape of the disk to be covered, one side being left open for its application to the disks while they are in position on the shafts. The edges joining with the fabric of the next adjacent disk on the same shaft are so arranged that they will lap over and be fastened so as to form a continuous extent of filtering material over all the disks which will be impervious at all points to the passage of solids. This cloth covering may be fitted snugly into position upon the metallic screen covered disk and firmly secured by sewing or by other adequate means, the use of a clamp being illustrated in Fig. 6. If it is desired a fibrous material may be used as a filtering medium, the material being applied to the disk in any suitable manner. By one method a fine metallic screen may be used instead of the cloth and the fibrous material after being suspended in a liquid, as water, is then pumped into the casing 1, the shafts being revolved, and the sludge outlet in the hopper 2 being closed until the screen is coated evenly with the fibrous material to the extent desired.

After the filtering material has been fitted into position, each disk is then covered with a second or outer layer of screen 10 fashioned after the same manner as the inner screen and conforming tightly to the outline of the disk. The office of this screen is three fold, first to protect the filtering medium 9 from abrasion by the solid matter filtered out, secondly to hold the filtering medium securely in position and thus prevent wear and displacement, and thirdly to insure the retention of a layer of the sludge upon the entire area of the filtering medium, which layer serves as an additional filtering surface and further protects the medium from wear and abrasion.

The screens may be constructed in any convenient manner such as by cutting out a number of sections, so shaped, that when each occupies its respective position upon the disks, all the edges exactly meet, as well as extending to those of the screens on the adjoining disks. The sections are then fastened together by means of wire or proper clips, being stretched tightly so as to present a continuous extent of screen over the entire filtering surface.

The operation of the machine proceeds as follows. Referring to Figs. 1, 2, 3, 4, 7 and 8, to set the apparatus in operation the sludge outlet valve at the bottom of the hopper 2 is closed and the disks being rotated in opposite directions as indicated by the arrows in Fig. 7, the inlet valve 5 at the top is opened to allow the unfiltered material to be pumped into the casing 1. As the casing fills, liquid will start passing through the filtering medium 9 and out through the tubular shafts 3 and $3^a$ and the solid or precipitate will be deposited upon the outer screen filtering surface 10. When the apparatus is full and the pressure increases, this may be maintained at any desired degree, the filtrate continues to pass through the filtering medium and the precipitate accumulates thereon proportionately. This accumulation continues to increase in thickness as the operation proceeds, until a thickness is reached such that as the disks pass each other in rotation, contact takes place between the coating of precipitate on the disks of one shaft and that on the disks of the other. The excess thickness on each disk, above the amount that will pass between them, is displaced or squeezed off the filtering surface, see Figs. 7 and 8, and falls by gravity toward the bottom of the hopper, 2. After reaching this stage in the operation all solid matter that is deposited upon the filtering surface during each rotation is displaced as soon as the point of contact between the sets of disks is reached. The material is displaced by squeezing, not by scraping, and those who are familiar with the art will recognize that this precipitate is not in the form of a more or less tough or gummy cake but is in the form of a soft and easily yielding sludge or fine mud which is easily rubbed off or displaced from the filter disks. When a sufficient amount of sludge has accumulated in the hopper 2, the sludge valve at the bottom thereof is open slightly to allow the continuous passage of the sludge of the consistency of softness that is desired. This withdrawal of the sludge will continue as long as the unfiltered material is pumped into the casing. The rate of discharge, as will be evident, will approximate the rate of inflow of the unfiltered material through the intake valve 5. The pressure set up by the pumping in of the unfiltered material serves also to force out the filtrate through the tubular shafts 3 and $3^a$ and the sludge out through its piping below the hopper 2. The sludge coming from the apparatus in the semi-liquid condition that it does may be easily pumped and readily passed through pipes, greatly facilitating its disposal.

The sludge, as it comes from the apparatus, consists of all the solid matter in the unfiltered material, retaining however a portion of the liquid or filtrate, and in many industries as in the manufacture of beet sugar, it is highly desirable that the solid matter be as completely free from the admixed liquid content as possible in order to recover all the available sugar content possible. This being the case it may be desirable to employ the continuous method of treatment illustrated diagrammatically in Fig. 9. The treatment in this continuous method embodies the feature of passing a stream of sludge through a series of filters in one direction and in passing a current of washed liquids through the same series but in a reversed direction, the sludge becoming weaker in soluble content and the wash liquid becoming proportionally enriched as the two are mixed in the various filter units and are passed in their respective direction.

Fig. 9 is a diagram, illustrating how this may be accomplished, using the simple filtering machines previously described and without any modification, except that the washing apparatus or individual filter machines may be much smaller as there may be much less material to handle. Fig. 9 illustrates a filter installation consisting of a battery of three filter units A, $A^1$, $A^2$, so connected as to discharge the sludge into a common header sludge 1. A single filter unit would have served for the purpose of illustration as well as a plurality. The discharge line from the first unit sludge 1 is connected to the suction of a centrifugal pump 2, into which is also connected the line delivering wash 3. This pump thoroughly mixes the washing liquid with the sludge and delivers the mixture to the washer 1, which is another filter unit similar to those of the series A, A′, etc. The action within this apparatus is identical with that in the filter above described in detail, the material being delivered from it as sludge 2 and wash 4, a washing action having taken place and the sludge containing less sugar than when it entered the apparatus and the washing liquid or filtrate containing more.

If it is desired to remove more sugar from the sludge, that is increase the degree of refinement, the operation is repeated, the sludge passes from washer 1 to pump 3, is mixed with wash 2, goes through washer 2 and is delivered as wash 3 and sludge 3. This is continued until the last washer is reached where the most completely exhausted sludge comes into contact with the original fresh wash liquid, the sludge 4 or final washed sludge passes out to be disposed of and the wash 4 from the washer 1 passes to the original filtrate or back to the filter 1 or to any point required in the process.

By this means of operation the principle of multiple washing or fractionation has been applied and without increasing the amount of the washing liquid the degree of exhaustion of the sludge may be increased by increasing the number of washing or filtering operations.

As the sludge and washing liquid are thoroughly mixed both in the pump and the filter casing, at each stage, this procedure effects a great improvement in the practice of washing precipitates, as it uses the least possible amount of the washing liquids and thus reduces to a minimum the amount of dilution of the original filtrate, which is a great economy in all such operations where it is necessary often to evaporate the filtrate to recover the material dissolved in it.

The apparatus may be provided with a jacket $1^a$ providing a chamber $1^b$, through which a heating or cooling medium may be circulated, or this jacket may be designed merely for insulation purposes. This feature makes the filter available for all purposes where it is necessary or advantageous to maintain a certain degree of heat during the operation of the filter.

It will be obvious from the foregoing that the filtering apparatus herein described may be adapted to use in any of the arts where it is of advantage to separate solids from liquid or as in the sugar industry to recover the soluble sugar content from the sugar containing solids.

Changes in construction, location of parts as well as in size and material may be made without departing from the scope of the invention.

What I claim is:

1. A rotary filter comprising a casing, a plurality of tubular shafts traversing the same, rotary filter members on each shaft, communicating passages between the interior of said filter members and the interior of said tubular shafts, and means for rotating said filter members, said shafts and filter members on adjacent shafts being spaced in relatively close relation whereby material adhering to the surface of the filter members is displaced and squeezed from between said members during their rotation.

2. A rotary filter comprising a casing, a plurality of tubular shafts traversing the same, rotary filter members on each shaft, communicating passages between the interior of said filter members and the interior of said tubular shafts, and means for rotating said filter members, said filter members on adjacent shafts rotating in opposite directions and being sufficiently close together so that material adhering to the surface of the filter members is displaced and squeezed from between said members during their rotation.

3. A rotary filter comprising a casing, a plurality of tubular shafts traversing the same, rotary filter members on each shaft, communicating passages between the interior of said filter members and the interior of said tubular shafts, and means for rotating said filter members, filter members on one shaft being mounted in closs proximity to the filter members on the adjacent shaft and arranged to turn in opposite directions, whereby material adhering to the surface of the filter members is displaced and squeezed from between said members during their rotation.

4. A rotary filter comprising a casing, a plurality of tubular shafts traversing the same, rotary filter members on each shaft, communicating passages between the interior of said filter members and the interior of said tubular shafts, and means for rotating said filter members, adjacent filter members on each shaft being spaced apart to receive the filter members on the adjacent shaft therebetween, the filter members on one shaft extending and rotating between the filter members on the adjacent shaft and in close proximity thereto.

5. A rotary filter comprising a casing, a plurality of tubular shafts traversing the same, rotary filter members on each shaft, communicating passages between the interior of said filter members and the interior of said tubular shafts, means for rotating said filter members, means for continuously feeding unfiltered material to said casing, said shafts and filter members on adjacent shafts being spaced relatively close together so that the sludge precipitate adhering to the surface of the filter members is displaced and squeezed from between said members during their rotation, and means for withdrawing the sludge precipitate from said casing at a rate in fixed ratio to the rate of feeding of unfiltered material to said casing.

6. A rotary filter comprising a casing, a plurality of tubular shafts traversing the same, rotary filter members on each shaft, communicating passages between the interior of said filter members and the interior of said tubular shafts, means for rotating said filter members, means for continuously feeding unfiltered material to said casing, said filter members on adjacent shafts rotating in opposite directions and being spaced sufficiently close together so that the sludge precipitate adhering to the surface of the filter members is displaced and squeezed from between said members during their rotation, and means for withdrawing the sludge precipitate from said casing at a rate in fixed ratio to the rate of feeding of unfiltered material to said casing.

7. A rotary filter comprising a casing, a plurality of tubular shafts traversing the same, rotary filter members on each shaft, communicating passages between the interior of said filter members and the interior of said tubular shafts, means for rotating said filter members, means for continuously feeding unfiltered material to said casing, filter members on one shaft being mounted in close proximity to the filter members on the adjacent shaft and arranged to turn in opposite directions whereby sludge precipitate adhering to the surface of the filter members is displaced and squeezed from between said members during their rotation, and means for withdrawing the sludge precipitate from said casing at a rate in fixed ratio to the rate of feeding of unfiltered material to said casing.

8. A rotary filter comprising a casing, a plurality of tubular shafts traversing the same, rotary filter members on each shaft, communicating passages between the interior of said filter members and the interior of said tubular shafts, means for rotating said filter members, means for continuously feeding unfiltered material to said casing, adjacent filter members on each shaft being spaced apart to receive the filter members on the adjacent shaft therebetween, the filter members on one shaft extending and rotating between the filter members on the adjacent shaft and in close proximity thereto, and means for withdrawing the sludge precipitate from said casing at a rate in fixed ratio to the rate of feeding of unfiltered material to said casing.

In testimony whereof I affix my signature in presence of two witnesses.

WALTON C. GRAHAM.

Witnesses:
H. SCILLEY,
BAILEY HUTCHINS.